UNITED STATES PATENT OFFICE.

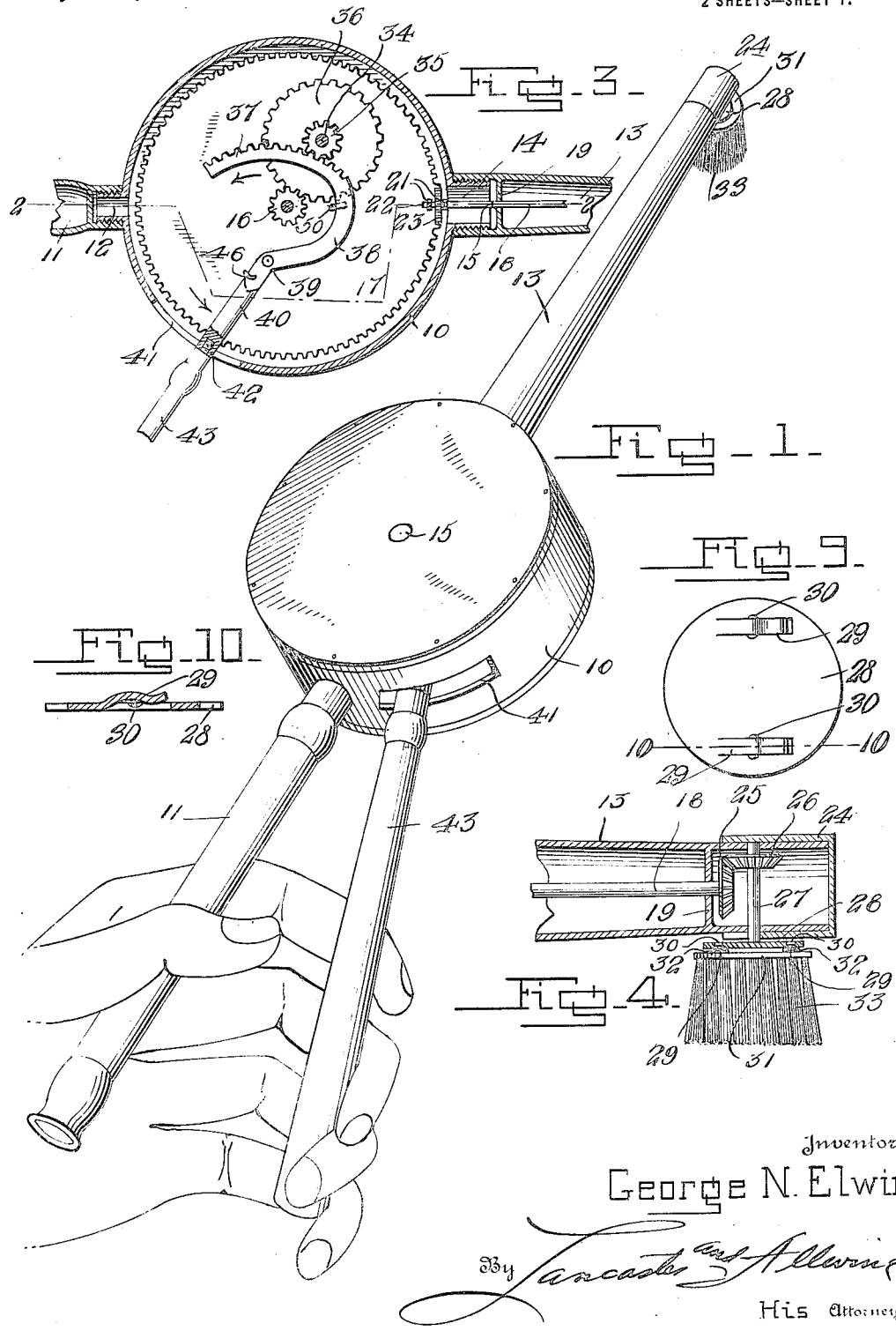

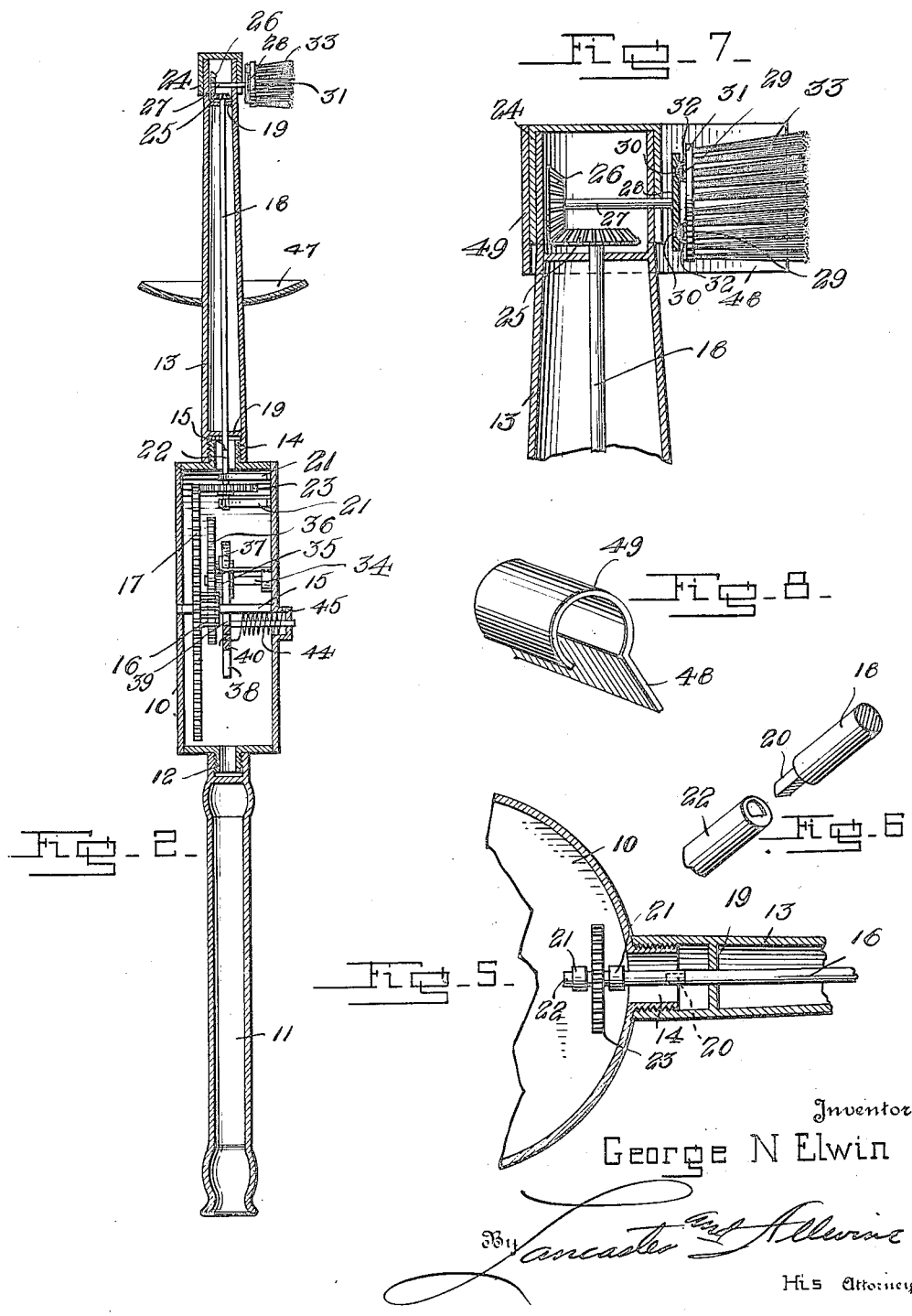

GEORGE N. ELWIN, OF VICTORIA, BRITISH COLUMBIA, CANADA.

ROTARY TOOTH-BRUSH.

1,225,230.    Specification of Letters Patent.    Patented May 8, 1917.

Application filed September 28, 1916. Serial No. 122,648.

*To all whom it may concern:*

Be it known that I, GEORGE N. ELWIN, a subject of the King of Great Britain, residing at Victoria, in the Province of British Columbia and the Dominion of Canada, have invented a certain new and useful Improvement in Rotary Tooth-Brushes, of which the following is a specification.

The present invention relates to a mechanical rotary brush of that character adapted to be operated by and held in the hand for cleansing the teeth.

The invention has for an object to provide a construction of brush which will thoroughly cleanse the teeth and remove the deleterious particles from between the same, comprises but relatively few parts which are capable of manufacture from stock material, and which is of neat appearance, is light in weight, and may be easily applied and handled.

Another object of the present invention is to provide a rotary brush structure the parts of which are detachably secured together, and which may be readily separated and packed into relatively small space for convenience in transportation.

Other objects and advantages of this invention, as well as the above, will be brought out more specifically in the following detailed description of the present preferred embodiment of the invention, the same being illustrated in the accompanying drawings wherein:

Figure 1 is a perspective view of a rotary brush constructed according to the present invention, the view showing the manner in which the brush is held in the hand.

Fig. 2 is a longitudinal central section taken through the brush of Fig. 1, on the line 2—2 of Fig. 3.

Fig. 3 is an enlarged fragmentary section taken through the drum or casing at right angles to the showing in Fig. 2.

Fig. 4 is a detail sectional view of the outer end of the brush, showing the mounting of the brush head upon the operating spindle.

Fig. 5 is a further enlarged fragmentary section of the outer end of the drum or casing, showing the detachable connection between the gearing and the driving shaft.

Fig. 6 is a detail perspective view of the interlocking connection between the inner end of the driving shaft and the gear mechanism in the casing.

Fig. 7 is a sectional view similar to Fig. 4, showing a detachable gum guard applied to the brush.

Fig. 8 is a detailed perspective view of the gum guard.

Fig. 9 is a plan view of the brush-attaching plate employed.

Fig. 10 is a transverse section taken through the plate on the line 10—10 of Fig. 9 showing one of the spring fingers or tongues for yieldably holding the brush to the plate.

Referring to these drawings, wherein like parts are designated by similar characters of reference throughout the several views, 10 designates a drum or casing which, as shown to advantage in Figs. 1 and 2 may be formed of a flat ring supporting opposed disks at its opposite edges, the parts being suitably secured together to house the operating mechanism.

At one end of the casing, hereinafter referred to as the inner end thereof, is preferably detachably secured a supporting handle 11. The outer end of the handle is hollow and internally threaded for detachable engagement over a threaded projection 12 on the inner end of the casing 10. A tubular arm 13 is carried upon the outer end of the casing 10 and extends in diametrical alinement with the supporting handle 11. The arm 13 is internally threaded at its inner end for detachable engagement over a projection 14 carried upon the outer end of the casing, which projection 14 is hollow and communicates with the casing 10 and with the tubular arm 13.

The casing or drum 10 is provided with a transversely extending centrally disposed shaft 15 upon which are fixed a relatively small pinion 16 and a relatively large gear wheel 17, the latter being of a diameter but slightly less than the diameter of the casing 10.

The tubular arm 13 carries a driving shaft 18 extending longitudinally therein and which is journaled near its opposite ends in webs 19. As shown in Figs. 5 and 6, the inner end of the shaft 18 is provided with a reduced shank 20 which is non-circular in cross section and which lies within the larger end of the tubular arm 13. Spaced-apart fingers 21 project inwardly from one side of the casing 10 and have registering bearings formed in their outer ends to support a socket shaft 22 which extends in longitudinal alinement with driving shaft 18. As shown in Fig. 6, this sprocket shaft 22 has an opening in its outer end of non-circular cross-section, and projects into the projection 14, receiving the shank 20 therein when the tubular arm 13 is secured in place.

The sprocket shaft 22 is provided with a gear wheel 23, which latter meshes with the large gear 17 and is adapted to be turned thereby. The outer end of the tubular arm 13 is provided with a cap 24 forming a housing on the outer end of the arm 13. The shaft 18 terminates at its outer end in the housing in the cap, and is provided with a bevel gear 25 intermeshing with a relatively small bevel gear 26 mounted on a brush-spindle 27 extending transversely through the casing or housing within the cap 24. One end of the spindle 27 projects through the cap 24 and is provided upon its outer end with an attaching plate 28. As shown in Figs. 4 and 9 particularly, the plate 28 is provided at diametrically opposite points with spring-fingers 29 stamped and pressed outwardly from the plate 28, and is also provided with sockets or depressions 30 behind the fingers 29. A brush-head 31, of preferably circular construction as shown, is of substantially the diameter of the attaching plate 28 and is provided at diametrically opposite points with rigid eyes or loops 32 through which the fingers 29 are adapted to be sprung. The spring arms are adapted to press the eyes 32 into the sockets 30 and thus yieldingly hold the brush-head 31 to the attaching plate 28. The brush-head 31 is provided in the usual manner with a bunch of bristles 33.

The operating means for turning the gear 17, and thus rotating the brush, comprises an arbor 34 extending transversely through one side of the casing 10 and upon which are mounted a small pinion 35 and a larger gear 36. The gear 36 is adapted to mesh with the pinion 16 on the main arbor or shaft 15, and the pinion 34 is adapted to mesh with a segment 37 provided with gear teeth in its periphery. One end of the segment 37 is provided with a curved supporting arm 38 pivoted at its free end upon a stud or pin 39 projecting from the adjacent side of the casing 10. The arm 38 is provided with a shank 40 which extends from the pin 39 substantially radially through a slot 41 in one side of the casing 10. The shank 40 is provided with a socket in its outer end to receive the stud 42 projecting from the forward end of a lever handle or arm 43. The handle 43 is adapted to move toward and from the fixed or supporting handle 11, the two handles 11 and 43 being adapted to be grasped in one hand.

The pin 39 carries thereabout a helical spring 44 having one end seated in a depression 45 formed in one side of the casing 10 and being secured at said end to the casing. The opposite end of the spring 44 is secured to the shank 40, as at 46, and is adapted to urge the shank 40 and the segment 37 in one direction. Preferably, the spring 44 holds the shank 40 away from the supporting handle 11, and moves the segment 37 in the direction indicated by the arrow in Fig. 3. The tubular arm 13 preferably tapers toward its outer end and is adapted for insertion in the mouth. The inner end of the tubular arm 13 is adapted to be grasped in the opposite hand and held in applied position. A concavo-convex disk 47 is placed around the arm 13, preferably intermediate its ends, and is adapted to protect the hand from contact with matter discharged from the brush.

To protect the gums from any possible injury, a guard may be used, such as shown in Figs. 7 and 8 of the drawings. The guard comprises a flat plate 48 provided upon its inner end with a spring tongue 49 curved to the configuration of and adapted to be sprung over the cap 24. The plate 48 lies at one side of the bunch of bristles 33 and prevents the latter from contact with the gums.

In operation, the handles 11 and 43 are normally separated by the spring 44, and when the bristles 33 are applied to the teeth, the operator closes one hand about the handles 11 and 43, and thus draws the hand-lever 43 toward the fixed handle 11. Such action swings the segment 37 about the pin 39 and causes the pinion 35 and its gear 36 to rotate. The gear 36 turns the pinion 16 and the large gear wheel 17, the latter rotating the small gear 23 at a relatively high rate of speed. The motion of the gear wheel 23 is imparted to the drive shaft 18, and the latter rotates the brush spindle 27 to drive the brush in one direction. The compression of the handles 11 and 43 compresses the spring 44, and as soon as the handles are released, the spring returns the segments 37 to normal position, and reverses the operation of the gears and the rotation of the brush.

The brush may be readily detached from the attaching plate 30 by holding the latter stationary, and drawing out and turning the brush-head 31 in a direction to disengage the spring fingers 29 from the eyes 32.

When it is desired to fold the device compactly, the tubular arm 13, and the handles 11 and 43 may be unscrewed from the casing 10 and from the shank 40 within the casing. The device is thus considerably reduced in length and may be packed in a box or the like occupying but relatively small space.

It is of course understood that this improved brush may be adapted to other uses than as above specifically set forth. The brush-head 31 and the bristles 33 may be of any desired configuration, or may be substituted by any other desired device according to the application to which the device is adapted to be put.

The hand-guard 47 may be made of rubber and be sprung over the inner end of the tubular arm 13 and adjusted along the arm to the desired extent from the casing 10. The guard 48 is adapted to protect the gums, when soft or sensitive, from contact with bristles 33 of the brush. This guard may be sprung into and from place by merely forcing the same over or from the cap 24.

A stop or finger 50 projects inwardly from one side of the casing 10 and is bent laterally to overhang the segment 37. This finger 50 holds the segment 37 in place and serves as a stop to limit the movement of the segment and the arm 38 when moved under the tension of the spring 44. The tubular arm 13 may be turned upon the threaded projection 14 into the position shown in Fig. 2 wherein the brush projects laterally from one of the flat sides of the casing 10.

What is claimed is:

1. In a tooth brush, the combination of a flat casing having operating mechanism therein, a supporting handle detachably connected to one edge of the casing and projecting outwardly in the plane thereof, an operating lever detachably connected to said mechanism and projecting therefrom through the casing in the plane thereof and in diverging relation to the handle, an arm detachably connected to the opposite edge of the casing and extending outwardly in the plane thereof and in longitudinal alinement with said handle to provide substantially a continuation thereof, a shaft carried longitudinally in said arm and adapted to be held in detachable engagement with said mechanism by the arm when in position, a brush spindle mounted transversely in the outer end of said arm and having operative connection with said shaft, and a brush mounted on the end of said spindle and extending outwardly at right angles to the arm for application to the teeth.

2. In a tooth brush, the combination of a supporting arm, an attaching plate mounted on the arm and having spring fingers upon its outer face, a brush head, and eyes projecting from the brush head adapted for engagement over said spring fingers, the attaching plate having sockets arranged behind said fingers to receive said eyes and yieldingly hold the brush head to the attaching plate.

3. In a rotary toothbrush, a tubular arm, a transversely extending spindle carried in one end of the arm and projecting through one side thereof, an attaching plate carried on said end of the spindle and having spaced-apart spring fingers upon its outer face, a brush-head, rigid eyes projecting from said brush-head for engagement over said spring fingers, said attaching plate having sockets arranged behind said fingers for the reception of said eyes to yieldingly hold the brush-head to said attaching plate, and a bunch of bristles mounted in said brush-head.

GEORGE N. ELWIN.

Witness:
CLEEVE G. WHITE.